June 30, 1964     T. R. STOCKTON     3,138,964
SEQUENTIALLY OPERABLE CLUTCH ASSEMBLY
Filed Dec. 31, 1962                                2 Sheets-Sheet 2

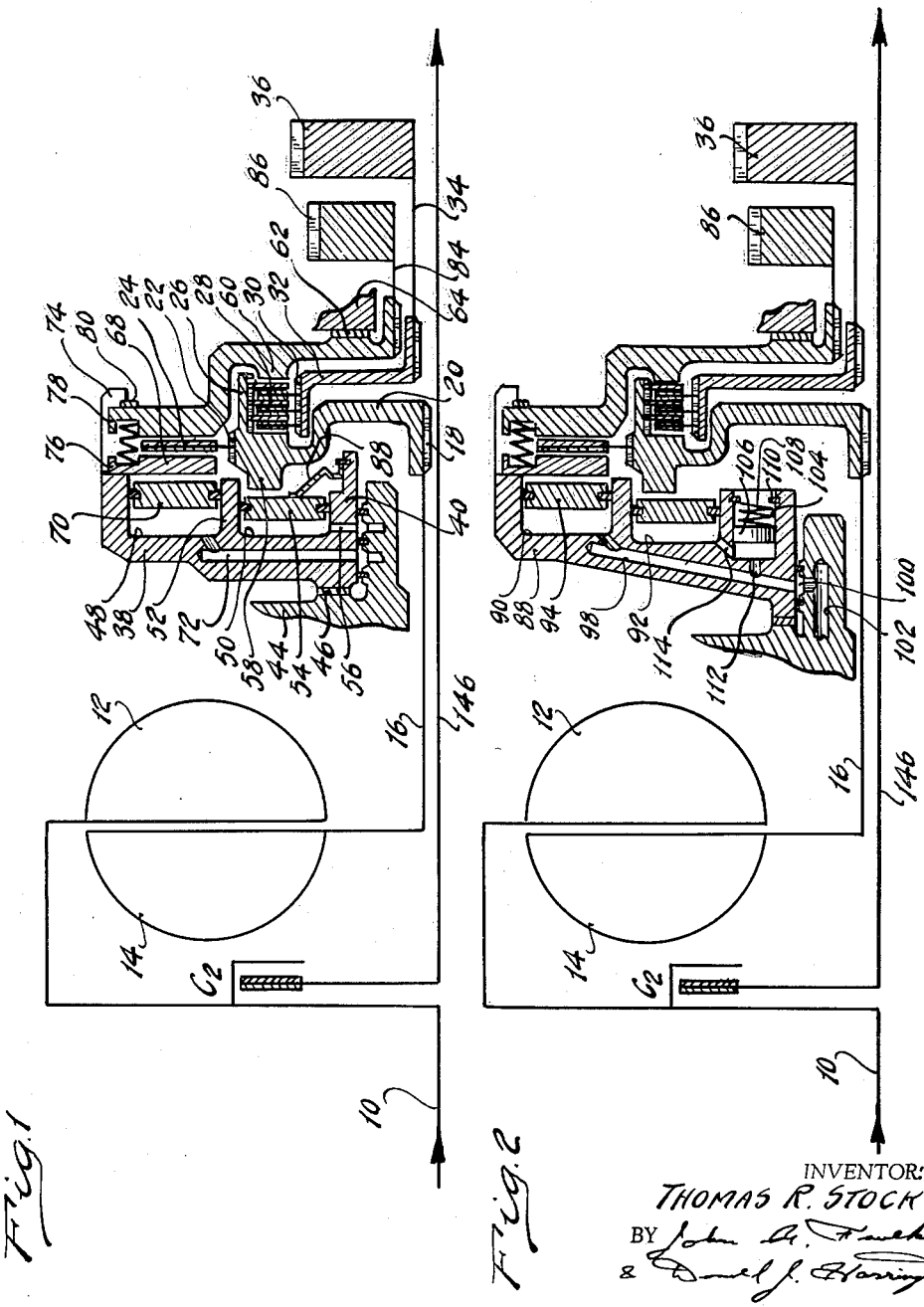

| RANGE | $C_4$ | $C_3$ | $C_2$ | $C_1$ | RATIO |
|---|---|---|---|---|---|
| LOW | ON | OFF | OFF | DRIVE | 3.286 |
| INT. (H.B.) | ON | ON | OFF | O'RUN | 1.730 |
| DIRECT | ON | OFF | ON | O'RUN | 1.00 |
| REVERSE | ON | OFF | OFF | DRIVE | 4.460 |
| NEUTRAL | OFF | OFF | OFF | — | — |

INVENTOR:
THOMAS R. STOCKTON
BY
ATTORNEYS.

United States Patent Office 3,138,964
Patented June 30, 1964

3,138,964
SEQUENTIALLY OPERABLE CLUTCH ASSEMBLY
Thomas R. Stockton, Northville, Mich., assignor to Ford Motor Company, Dearborn, Mich., a corporation of Delaware
Filed Dec. 31, 1962, Ser. No. 248,335
11 Claims. (Cl. 74—330)

My invention relates generally to compound friction torque establishing devices, and more particularly to a tandem clutch arrangement comprising a single clutch housing and sequentially controlled clutch operating servos.

I contemplate that my invention may be applied readily to a multiple speed ratio gear unit capable of establishing plural torque delivery paths between a driving member and a driven member in a power train. If the operating environment is an automotive vehicle power transmission mechanism, the driven member of the gear unit may be connected drivably to the vehicle traction wheels. The gear unit would be provided with two power input gear elements, each of which may be connected to the vehicle engine. In a preferred embodiment of my invention, a fluid coupling is provided between the engine and the gear unit, the turbine torque of the coupling being delivered to either one or the other of the input gear elements through my improved clutch structure.

A first torque delivery path between the coupling turbine and the power output shaft may be established by engaging a first clutch of my tandem clutch arrangement. This establishes a high torque multiplication ratio for vehicle acceleration purposes. After a desired vehicle speed is obtained for any given input torque, the second clutch may be applied thus establishing an intermediate torque multiplication ratio. The torque ratio shift from the high torque multiplication ratio to the intermediate ratio can be accomplished in a nonsynchronous fashion by employing an over-running clutch in the torque delivery path that is established during operation in the highest torque multiplication ratio.

My simplified arrangement includes a separate controlling mechanism within a common clutch housing for the separate clutches, each mechanism including an independent fluid pressure operated servo.

In the embodiment set forth in this disclosure, I have provided a countershaft type gear arrangement having a cluster gear assembly and stepped torque delivery ratio gears disposed in meshing engagement with separate gear elements of the cluster gear assembly. The torque delivery gears are disposed about a common main shaft.

For the purpose of describing more particularly the improvements of my invention, reference may be made to the accompanying drawings, wherein:

FIGURE 1 shows in cross-sectional form my improved tandem clutch arrangement;

FIGURE 2 shows an alternate embodiment of the clutch arrangement of FIGURE 1;

Figures 3, 4:
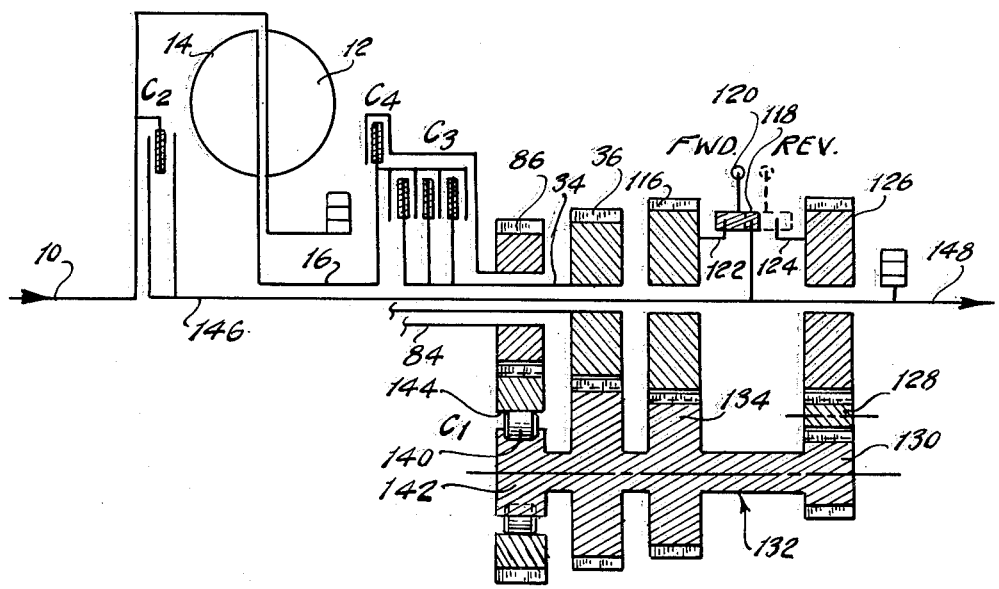
FIGURE 3 shows in schematic form a countershaft type gear unit capable of accommodating the improvemens of my invention; and, FIGURE 4 is a table showing the pattern for the engament and release of the clutches of FIGURE 3 during operation in the various drive ranges.

Referring first to FIGURE 1, numeral 10 designates a power input shaft that may be in the form of a crankshaft for internal combustion engines. Shaft 10 can be connected to a pump or impeller member 12 for a hydrokinetic coupling. This member 12 is situated in toroidal fluid flow relationship with respect to a turbine member 14. The turbine member 14 in turn is connected to a turbine shaft 16 which is splined at 18 to a clutch member 20. The periphery of the clutch member 20 is splined, as shown at 22, for the purpose of establishing a driving connection with an internally splined clutch disc 24. The periphery of clutch member 20 also is formed with an extension 26 which is internally splined to accommodate a driving connection with externally splined clutch discs of a multiple disc clutch assembly 28. Internally splined clutch discs of the multiple disc clutch assembly 28 are situated in driving relationship with respect to an externally splined extension 30 of another clutch member 32. This clutch member 32 is connected, preferably by splines, to a sleeve shaft 34 which in turn is connected to an intermediate speed gear element 36 of a countershaft type gear arrangement subsequently to be described with reference to FIGURE 3.

A clutch drum is shown at 38. It includes a hub portion 40 that is journalled upon an extension 42 which may be connected to a relatively stationary transmission housing shown in part at 44. A first washer 46 is situated between hub 40 and housing 44.

The clutch drum member 38 defines a first annular cylinder 48 and a second annular cylinder 50, the former being situated radially outwardly of the latter. These cylinders 48 and 50 are separated and defined in part by an annular separating wall 52.

An annular piston 54 is positioned within the cylinder 50. It cooperates with the cylinder 50 to define a working chamber that may be supplied with pressurized fluid through a pressure distributor passage 56 communicating with a mating annular groove in the extension 42. Appropriate sealing rings can be situated at either side of the passage 56.

A clutch member 20 is formed with a pressure plate 58 and a portion disposed directly adjacent annular piston 54. The pressure plate 58 is adapted to exert axial pressure upon the multiple disc clutch assembly 28 when pressure is admitted to the chamber 50.

The reaction force that is produced upon application of pressure to chamber 50 is taken upon a clutch plate 60 having a portion situated directly adjacent one side of the multiple disc clutch assembly 28. A thrust washer 62 is disposed between plate 60 and a relatively stationary boss 64 formed on the transmission housing.

The radially outward portion of the plate 60 is formed with a friction surface 66 which is situated directly adjacent the clutch disc 24. A pressure plate 68 is situated adjacent the other side of the clutch disc 24.

An annular piston 70 is received within annular cylinder 48 and defines therewith a pressure cavity that may be supplied with pressure fluid through a passage 72. This passage can communicate with a pressure distributing groove formed in the extension 42. Fluid under pressure can be distributed in turn to this annular groove through suitable manifold structure.

The radially outward periphery of the clutch drum 38 is formed with a plurality of axially extending slots 74. The periphery of pressure plate 68 is formed with radially extending projections 76 which are received within the slots 74. Relative angular motion of the pressure plate 68 with respect to the clutch drum 38 thus is inhibited. In a similar fashion, clutch plate 60 is formed at its periphery with projections 78 which are received within the slots 74. Relative angular motion of plate 60 with respect to clutch drum 38 also is inhibited in this fashion.

A snap ring 80 carried by the inner periphery of drum 38 prevents axial movement of the clutch plate 60 with respect to the clutch drum 38.

A plurality of clutch release springs is provided at a location between plate 60 and separator plate 68. One such spring is illustrated in FIGURE 1 at 82.

The hub of clutch plate 60 is splined or otherwise positively connected to a sleeve shaft 84 which in turn is connected to a second gear 86 for the gear unit to be described with reference to FIGURE 3.

A piston return spring 88 is situated between a snap ring carried by hub 40 and the piston 54. It normally urges piston 54 in a right hand direction as viewed in FIGURE 1.

It will be apparent from FIG. 1 that if fluid pressure is admitted to the working chamber behind piston 54, member 20 will become locked to clutch plate 60 by reason of the engagement of clutch disc 24 with the adjacent surface 66 and the clutch pressure plate 68. This establishes a driving connection between turbine member 14 and gear element 86. It will be apparent also that if fluid pressure is admitted to the working chamber behind piston 70, a driving connection will be established between clutch member 20 and the shaft 32. Thus a driving connection is established between turbine member 14 and the gear element 36.

Each of the gear elements 36 and 86 may form a part of separate torque delivery paths having independent torque multiplication ratios.

In FIGURE 2 I have illustrated an alternate embodiment of my clutch construction. As in the previous embodiment, it includes a single clutch housing that is identified by reference character 88. Formed within this housing 88 is a pair of annular pressure chambers 90 and 92 within which annular pistons 94 and 96 are received. The annular pressure chamber 90 is situated radially outwardly of the annular pressure chamber 92. If the clutch construction of FIGURE 2 is disposed in an operating environment of the type illustrated in FIGURE 1, the fluid pressure forces acting upon piston 94 will cause engagement of a clutch disc 24', corresponding to clutch disc 24 in FIGURE 1, by its associated pressure plate. Similarly, if fluid pressure is admitted behind piston 96, it will cause engagement of a multiple disc clutch assembly 28 corresponding to the assembly 28 of FIGURE 1. The clutch discs, the gear elements and the coupling of FIGURE 2 are similar to the corresponding structure of FIGURE 1, and for this reason similar reference numerals have been applied. Primed notations, however, have been used in FIGURE 2 to distinguish from the corresponding numerals of FIGURE 1.

Unlike the pressure distributor passage structure of FIGURE 1, the fluid pressure circuit for FIGURE 2 employs a single fluid pressure feed. This circuit is defined by a passage 98 formed in clutch housing member 38. The outer extremity of passage 98 communicates with the annular pressure chamber 90, and the inward portion of passage 98 communicates with an annular pressure supply groove 100. This groove in turn is supplied with pressure fluid through a pressure delivery passage 102 which may form a part of an automatic control valve circuit, not shown.

The clutch member 88 is provided with a cylindrical opening 104 within which is disposed a cooperating piston 106. This piston is in the form of a sequence or shuttle valve, and is spring urged by a spring 108 in a left hand direction as viewed in FIG. 2. This spring 108 is anchored at one end against a spring seat in the form of a snap ring 110.

A branch passage 112 establishes communication between the right hand end of opening 104 and passage 98. The radially outwardly directed passage 114 establishes communication between pressure chamber 92 and the opening 104. If the piston 106 is in an extreme right hand position, it blocks fluid communication between branch passage 112 and passage 114. If the piston 106 assumes the position shown in FIGURE 2, however, communication is established between passage 98 and the pressure chamber 92.

During operation of the clutch construction of FIGURE 2, control pressure can be supplied initially to passage 98. Thus pressure chamber 90 becomes pressurized to cause frictional engagement of the radially outwardly disposed clutch mechanism. At this instant, piston 106 assumes a sealing position and prevents pressure distribution to the pressure chamber 92. If the pressure within passage 98 is allowed to increase in magnitude following clutch engagement of the radially outwardly disposed clutch mechanism, piston 106 will be urged to a right hand position against the opposing force of spring 108. This then establishes communication between passage 98 and the pressure chamber 92 to allow the radially inwardly disposed clutch mechanism to be applied. The piston 106 thus functions as a sequence valve to permit timed engagement of the two clutch mechanisms.

During operation in the lowest speed ratio, the radially outwardly disposed clutch mechanism can be applied by distributing pressure at a controlled value to passage 98. To establish a shift from that ratio to the next higher speed ratio, it then merely is necessary to increase the operating pressure level of the fluid in passage 98 by an appropriate control mechanism, not shown.

Referring next to FIGURE 3, I have illustrated an operating environment for the clutch mechanism of FIGURES 1 and 2. For the purposes of simplicity, the clutch mechanism of which clutch disc 24 forms a part has been designated in FIGURE 3 by symbol $C_4$. Also, the multiple disc clutch assembly 28 has been identified in FIGURE 3 by the symbol $C_3$. A third clutch, designated by the symbol $C_2$, is adapted to provide a direct driving connection between power input shaft 10 and shaft 16 when it is applied. Servo structure, not shown, can be used for applying and releasing clutch $C_2$.

As seen from FIGURE 3, gear elements 86 and 36 are mounted for rotation about the axis of shaft 16. A third gear element 116 is situated adjacent gear element 36 and is mounted also for rotation about the axis of shaft 16. Gear element 116 can be clutched to shaft 16 by a dog-clutch that comprises a splined sleeve 118. This sleeve can be moved axially in one direction or the other by a manually controlled selector member 120. If the sleeve 118 is moved to the position shown in FIGURE 3, it is capable of positively engaging an externally splined member 122 connected to gear element 116. Sleeve 118 assumes this position whenever the mechanism is conditioned for forward drive operation. If the sleeve 118 is shifted in a reverse direction, however, element 122 is disengaged and element 124 is engaged. Thus this element 124 becomes connected to shaft 16 through the sleeve 118.

A reverse gear 126 also is mounted rotatably for rotation about the axis of shaft 16. It carries element 124 and becomes locked to shaft 16 when sleeve 118 is shifted to the reverse position illustrated in FIGURE 3 by phantom lines.

Reverse gear element 126 is disposed in meshing engagement with a reverse idler pinion 128 which is mounted for rotation about an axis parallel to the shaft 16. Pinion 128 in turn engages a reverse gear element 130 that forms a part of a cluster gear assembly generally designated by reference character 132. This cluster gear assembly is mounted for rotation about an axis parallel to the axes of shaft 16 and reverse idler pinion 128.

Cluster gear assembly 132 includes gear elements 134, 136 and 138 which respectively engage gear elements 116, 36 and 86. It includes also an over-running coupling connection comprising clutch rollers 140, inner clutch race 142 and outer clutch race 144. The outer clutch race 144 may be cammed to establish clutching engagement with the rollers 140, thereby inhibiting relative rotation of gear 138 in one direction relative to gear elements 134 and 136 while accommodating free-wheeling relative motion thereof in the opposite direction.

Turbine 14 is adapted to be connected to sleeve shaft 16. For purposes of simplicity, the radially outward clutch structure of FIGURE 1 is designated in FIGURE 3 by symbol $C_4$ and the radially inward multiple disc clutch structure designated in FIGURE 3 by symbol $C_3$.

Power input shaft 10 can be connected to a central shaft 146 by means of the selectively engageable clutch $C_2$. This establishes a direct connection between shaft 10 and the shiftable clutch sleeve 119.

The mechanism of FIGURE 3 is capable of establishing three forward driving speed ratios and a single reverse speed ratio. To establish the lowest speed ratio, clutch $C_4$ is engaged. Turbine torque then is delivered through clutch $C_4$ to gear element 86. This drives gear element 138 of the cluster gear assembly 132 and the torque passes through the over-running coupling to gear element 134. Sleeve 118 is shifted in a left hand direction to establish a direct connection between gear element 116 and shaft 146, the latter being connected directly to power output shaft 148. Thus, turbine torque is multiplied by gear elements 86 and 138, and by gear elements 134 and 116.

To establish intermediate speed ratio operation, clutch $C_3$ is engaged while clutch $C_4$ remains engaged. Turbine torque then is delivered directly through clutch $C_3$ to the gear element 36. This causes the over-running coupling for gear element 138 to over-run. The turbine torque then is multiplied by gear elements 36 and 136 and by gear elements 134 and 116. Since the pitch diameter of gear element 36 is greater than the pitch diameter of gear element 86, the mechanism operates with a higher speed ratio.

Direct drive high speed operation is accomplished by releasing clutch $C_3$ and by applying clutch $C_2$. This establishes a direct drive connection between the engine and the output shaft 148.

Reverse drive is accomplished by shifting the sleeve 118 to the reverse drive position. This establishes a direct drive connection between gear element 126 and power output shaft 148. Turbine torque then is delivered through gear elements 86 and 138 and through elements 130 and 126, the latter two elements being drivably connected by reverse idler pinion 128, which reverses the direction of the motion.

Referring now to FIGURE 4, the sequence in the operation of the various clutches can be observed readily. Typical gear multiplication ratios also are shown in FIGURE 4.

The sequential operation of clutches $C_4$ and $C_3$ can be obtained by controlling pressure distribution to passage 72 and passage 56. In the clutch mechanism of FIGURE 1, pressure is distributed initially to passage 72 thus causing the radially outward clutch disc assembly to become applied. As fluid pressure is admitted to the working chamber behind annular piston 70, piston 70 is shifted in a right-hand direction, as viewed in FIGURE 1, thus shifting pressure plate 68 into engagement with clutch disc 24 against the opposing force of springs 82. Slots 74 and projections 76 permit this shifting motion to occur.

Pressure can be distributed to passage 56 when an upshift from a lower speed ratio to the intermediate ratio is desired. This causes piston 54 to shift into engagement with pressure plate 58, and the pressure force applied to piston 54 causes frictional engagement of the multiple disc clutch assembly 28 thereby connecting shaft 16 with intermediate speed gear element 36. As the multiple disc clutch assembly 28 thus is applied, the over-running coupling associated with gear element 188 begins to over-run.

If the embodiment of FIGURE 2 is used, the previously described sequential clutch engagement may be obtained by using a single pressure feed. Under these conditions, pressure is distributed to passage 98 to effect engagement of the radially outward clutch disc assembly. The value of the pressure that will cause engagement of clutch $C_4$ will be less than that value required to shift the sequence valve 106.

If an upshift in the intermediate speed ratio is desired, it is merely necessary to increase the level of the control pressure applied to passage 98. This causes shifting movement of the sequence valve to uncover passage 114, thus allowing clutch pressure to reach the annular cylinder 50.

Having thus described preferred embodiments of my invention, what I claim and desire to secure by United States Letters Patent is:

1. A multiple clutch assembly comprising a first clutch member, a pair of clutch cylinders disposed in said first clutch member, a second clutch member, a piston disposed in each cylinder, a third clutch member, a first clutch disc assembly having portions carried by said first and second clutch members, a second clutch disc assembly having portions carried by said second and third clutch members, and means for distributing fluid pressure to each cylinder, the force applied to the piston in said first cylinder causing engagement of said first clutch disc assembly and the force applied to the piston in said second cylinder causing engagement of said second clutch disc assembly.

2. In a torque delivery mechanism capable of delivering torque from a driving member selectively to driven members, a multiple clutch assembly comprising a first clutch member, a pair of clutch cylinders disposed in said first clutch member, a second clutch member drivably connected to said driving member, a piston disposed in each cylinder, a third clutch member, said first clutch member being connected to a first driven member and said third clutch member being connected to a second driven member, a first clutch disc assembly having friction portions carried by said first and second clutch members, a second clutch disc assembly having friction portions carried by said second and third clutch members, and means for distributing fluid pressure to each cylinder, the force applied to the piston in said first cylinder causing engagement of said first clutch disc assembly and the force applied to the piston in said second cylinder causing engagement of the said second clutch disc assembly.

3. A power transmission mechanism comprising a multiple speed ratio gear unit having two power input gear elements, a driving member, said gear elements comprising separate torque delivery paths between said driving member and driven member, a multiple disc clutch assembly comprising a first clutch member, a pair of clutch cylinders disposed in said first clutch member, a second clutch member connected to said driving member, a piston disposed in each cylinder, a third clutch member, a first clutch disc assembly having friction portions carried by said first and second clutch members, a second clutch disc assembly having friction portions carried by such second and third clutch members, and means for distributing selectively fluid pressure to each cylinder, the force applied to the piston in said first cylinder causing engagement of said first clutch disc assembly and the force applied to the piston in said second cylinder causing engagement of said second clutch disc assembly.

4. A power transmission mechanism comprising a multiple speed ratio gear unit having two power input gear elements, a driving member, said gear elements comprising separate torque delivery paths between said driving member and driven member, a multiple disc clutch assembly comprising a first clutch member, a pair of clutch cylinders disposed in said first clutch member, a second clutch member connected to said driven member, a piston disposed in each cylinder, a third clutch member, a first clutch disc assembly having friction portions carried by said first and second clutch members, a second clutch disc assembly having friction portions carried by said second and third clutch members, means for distributing selectively fluid pressure to each cylinder, the force applied to the piston in said first cylinder causing engagement of said first clutch disc assembly and the force applied to the piston in said second cylinder causing engagement of said second clutch disc assembly, and a common reaction member for said first and second clutch disc assemblies, said reaction member being connected to said first clutch member and having separate friction surfaces situated adjacent each clutch disc assembly.

5. A multiple clutch assembly comprising a first clutch member, a pair of annular cylinders disposed in said first clutch member, one cylinder being situated radially outward with respect to the other, a second clutch member, an annular piston disposed in each cylinder, a third clutch member, a first clutch disc assembly having portions carried by said first and second clutch members, a second clutch disc assembly having portions carried by said second and third clutch members, and means for distributing fluid pressure to each cylinder, the force applied to the piston in said first cylinder causing engagement of said first clutch disc assembly and the force applied to the piston in said second cylinder causing engagement of said second clutch disc assembly.

6. In a torque delivery mechanism capable of delivering torque from a driving member selectively to driven members, a multiple clutch assembly comprising a first clutch member, a pair of annular cylinders disposed in said first clutch member, one cylinder being situated radially outwardly with respect to the other, a second clutch member drivably connected to said driving member, an annular piston disposed in each cylinder, a third clutch member, said first clutch member being connected to a first driven member and said third clutch member being connected to a second driven member, a first clutch disc assembly having friction portions carried by said first and second clutch members, a second clutch disc assembly having friction portions carried by said second and third clutch members, and means for distributing fluid pressure to each cylinder, the force supplied to the piston in said first cylinder causing engagement of said first clutch disc assembly, and the force supplied to the piston in said second cylinder causing engagement of the said second clutch disc assembly.

7. A power transmission mechanism comprising a multiple speed ratio gear unit having two power input gear elements, a driving member, a driven member, said gear elements comprising separate torque delivery paths between said driving member and driven member, a multiple disc clutch assembly comprising a first clutch member, a pair of annular cylinders disposed in said first clutch member, one cylinder being situated radially outwardly with respect to the other, a second clutch member, an annular piston disposed in each cylinder, a third clutch member, a first clutch disc assembly having friction portions carried by said first and second clutch members, a second clutch disc assembly having friction portions carried by said second and third clutch members, and means for distributing selectively fluid pressure to each cylinder, the force applied to the piston in said first cylinder causing engagement of said first clutch disc assembly and the force applied to the piston in said second cylinder causing engagement of said second clutch disc assembly.

8. A power transmission mechanism comprising a multiple speed ratio gear unit having two power input gear elements, a driving member, a driven member, said gear elements comprising separate torque delivery paths between said driving member and said driven member, a multiple disc clutch assembly comprising a first clutch member, a pair of annular cylinders disposed in said first clutch member, one cylinder being situated radially outwardly with respect to the other, a second clutch member, an annular piston disposed in each cylinder, a third clutch member, a first clutch disc assembly having friction portions carried by said first and second clutch members, a second clutch disc assembly having friction portions carried by said second and third clutch members, means for distributing selectively fluid pressure to each cylinder, the force applied to the piston in said first cylinder causing engagement of said first clutch disc assembly and the force applied to the piston in said second cylinder causing engagement of said second clutch disc assembly, and a common reaction member for said first and second clutch disc assemblies, said reaction member being connected to said first clutch member and having separate friction surfaces situated adjacent each clutch disc assembly.

9. A multiple clutch assembly comprising a first clutch member, a pair of clutch cylinders disposed in said first clutch member, a second clutch member, a piston disposed at each cylinder, a third clutch member, a first clutch disc assembly having portions carried by said first and second clutch members, a second clutch disc assembly having portions carried by said second and third clutch members, means for distributing fluid pressure to each cylinder, the force applied to the piston in said first cylinder causing engagement of said first clutch disc assembly and the force applied to the piston in said second cylinder causing engagement of said second clutch disc assembly, said pressure distributing means comprising a single pressure distributor passage having branch portions extending to each cylinder, the branch portions extending to one cylinder including a sequence valve chamber, a sequence valve element disposed in said chamber, and means for normally biasing said sequence valve element in one direction to interrupt fluid communication between said passage and said one cylinder, said sequence valve element being urged in the opposite direction by the pressure force established by the pressure in said passage to establish fluid communication between said one cylinder and said passage when the pressure reaches a predetermined value.

10. A power transmission mechanism comprising a multiple speed ratio gear unit having two power input gear elements, a driving member, a driven member, said gear elements comprising separate torque delivery paths between said driving member and said driven member, a multiple disc clutch assembly comprising a first clutch member, a pair of clutch cylinders disposed in said first clutch member, a second clutch member, a piston disposed in each cylinder, a third clutch member, a first clutch disc assembly having friction portions carried by said first and second clutch members, a second clutch disc assembly having friction portions carried by said second and third clutch members, means for distributing selectively fluid pressure to each cylinder, the force applied to the piston in said first cylinder causing engagement of said first clutch disc assembly and the force applied to the piston in said second cylinder causing engagement of said second clutch disc assembly, said pressure distributing means comprising a single pressure distributor passage having branch portions extending to each cylinder, the branch portions extending to one cylinder including a sequence valve chamber, a sequence valve element disposed in said chamber, and means for normally biasing said sequence valve element in one direction to interrupt fluid communication between said passage and said one cylinder, said sequence valve element being urged in the opposite direction by the pressure force established by the pressure in said passage to establish fluid communication between said one cylinder and said passage when the pressure reaches a predetermined value.

11. A multiple clutch assembly comprising a first clutch member, a pair of annular cylinders disposed in said first clutch member, one cylinder being situated radially outwardly with respect to the other, a second clutch member, an annular piston disposed in each cylinder, a third clutch member, a first clutch disc assembly having portions carried by said first and second clutch members, a second clutch disc assembly having portions carried by said second and third clutch members, means for distributing fluid pressure to each cylinder, the force applied to the piston in said first cylinder causing engagement of said first clutch disc assembly and the force applied to the piston in said second cylinder causing engagement of said second clutch disc assembly, said pressure distributing means comprising a single pressure distributor passage having branch portions extending to each cylinder, the branch portions extending to one cylinder including a sequence valve chamber, a sequence valve element disposed in said chamber, and means for normally biasing said sequence valve element in one direction to interrupt fluid communication between said passage and said one cylinder, said sequence valve element being urged in the opposite direction by the pressure force established by the pressure in said passage to establish fluid communication between said one cylinder and said passage when the pressure reaches a predetermined value.

References Cited in the file of this patent
UNITED STATES PATENTS

| | | |
|---|---|---|
| 2,524,342 | Descendre | Oct. 3, 1950 |
| 2,544,551 | Black | Mar. 6, 1951 |
| 2,642,168 | Black et al. | June 6, 1953 |